US008813494B2

United States Patent
Hofer et al.

(10) Patent No.: US 8,813,494 B2
(45) Date of Patent: Aug. 26, 2014

(54) METHOD AND SYSTEM FOR A TURBOCHARGED ENGINE

(75) Inventors: Douglas C. Hofer, Niskayuna, NY (US);
Anthony Furman, Niskayuna, NY (US);
Thomas Lavertu, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 428 days.

(21) Appl. No.: 13/226,543

(22) Filed: Sep. 7, 2011

(65) Prior Publication Data
US 2013/0055711 A1    Mar. 7, 2013

(51) Int. Cl.
| F02B 33/44 | (2006.01) |
| F02B 41/10 | (2006.01) |
| F02B 37/00 | (2006.01) |
| F02B 37/013 | (2006.01) |
| F02B 37/18 | (2006.01) |

(52) U.S. Cl.
CPC .............. *F02B 37/005* (2013.01); *F02B 37/013* (2013.01); *F02B 37/004* (2013.01); *F02B 41/10* (2013.01); *F02B 37/18* (2013.01); *Y02T 10/144* (2013.01); *Y02T 10/163* (2013.01)
USPC ..................... 60/612; 60/614; 60/608; 60/624

(58) Field of Classification Search
CPC ...... F02B 37/005; F02B 37/00; F02B 37/013; F02B 37/004; F02B 37/18; F02B 41/10; Y02T 10/144; Y02T 10/163
USPC ............................ 60/607–609, 614, 624, 612
IPC ....................................................... F02B 41/10
See application file for complete search history.

(56) References Cited

U.S. PATENT DOCUMENTS

| 4,391,098 A | * | 7/1983 | Kosuge ........................... 60/624 |
| 4,719,756 A | * | 1/1988 | Streuli ............................ 60/624 |
| 6,502,398 B2 | * | 1/2003 | Kapich ........................... 60/608 |
| 7,398,650 B2 | | 7/2008 | Bottcher et al. |
| 7,823,391 B2 | | 11/2010 | Beardsley |

(Continued)

FOREIGN PATENT DOCUMENTS

| DE | 3807372 A1 | * | 9/1989 | .............. F02B 41/10 |
| EP | 2042705 A1 | * | 4/2009 | .............. F02B 41/10 |

(Continued)

OTHER PUBLICATIONS

A Machine Translation Miyajima Toshihide (Pub. Number JP 2000-179348 A), published on Jun. 27, 2000.*
Carl T. Vuk. "Electro Turbo Compunding—A Technology Who's Time Has Come." John Deer Technical Center. Advanced Engineering. Aug. 24, 2006. pp. 1-27.

*Primary Examiner* — Thai Ba Trieu
(74) *Attorney, Agent, or Firm* — GE Global Patent Operation; John A. Kramer

(57) ABSTRACT

Methods and systems are provided for operating a turbocharged engine. An engine system comprises a turbocharger, a bypass path, and a turbo-compound unit. The turbocharger may include a turbine mechanically coupled to a compressor. The turbo-compound unit may include a turbine mechanically coupled to a load, such as a generator. The turbo-compound unit may be coupled in a bypass path around the turbocharger turbine. In this manner, thermodynamic energy flowing through the bypass path may be harvested to increase the engine-operating efficiency. Further, gas flow through the bypass path may be adjusted to potentially improve the transient response of the turbocharger.

13 Claims, 6 Drawing Sheets

(56) References Cited

U.S. PATENT DOCUMENTS

| | | |
|---|---|---|
| 7,926,270 B2 | 4/2011 | Weaver et al. |
| 7,958,727 B2 | 6/2011 | Arnold |
| 2002/0157397 A1 * | 10/2002 | Kapich .......................... 60/608 |
| 2006/0113799 A1 | 6/2006 | Obayashi et al. |
| 2009/0250933 A1 | 10/2009 | Delf |
| 2009/0299609 A1 | 12/2009 | Gokhale |
| 2010/0043432 A1 | 2/2010 | Filippone |
| 2010/0154414 A1 | 6/2010 | Schwarzenthal et al. |
| 2011/0018267 A1 | 1/2011 | Oriet et al. |
| 2011/0020108 A1 | 1/2011 | Axelsson et al. |

FOREIGN PATENT DOCUMENTS

| | | | | |
|---|---|---|---|---|
| JP | 60240831 A | * | 11/1985 | .............. F02B 41/10 |
| JP | 63183225 A | * | 7/1988 | .............. F02B 41/10 |
| JP | 63186916 A | * | 8/1988 | .............. F02B 41/10 |
| JP | 06066151 A | * | 3/1994 | .............. F02B 41/10 |
| JP | 10169455 A | * | 6/1998 | .............. F02B 41/10 |
| JP | 20001179348 A | | 6/2000 | |
| JP | 2007085226 A | | 4/2007 | |

\* cited by examiner

METHOD AND SYSTEM FOR A TURBOCHARGED ENGINE

FIELD

Embodiments of the subject matter disclosed herein relate to systems and methods for an engine including a turbocharger.

BACKGROUND

An engine system may include a turbocharger to increase charge density during combustion, to increase power output and/or engine-operating efficiency. The turbocharger may include a compressor driven by a turbine, where the rotational speed of the compressor is controlled at least partially by the rate of gasses flowing through the turbine. The rotational speed of the compressor may affect the charge density during combustion, the efficiency of the compressor, and the peak cylinder pressure. Therefore, it may be desirable to independently control the rotational speed of the compressor to match the engine operating requirements over the full performance range of the engine.

One solution for controlling the rotational speed of the compressor is to include a bypass path around the turbine that is controlled by a wastegate valve. Ideally, the system would be designed such that the bypass would be closed at all steady-state operating conditions. However, to meet the operating and emission requirements of the engine, during some operating conditions, the engine system is operated with the bypass at least partially open. For example, the wastegate valve opening may be increased to increase the flow of gasses through the bypass path, decrease the flow of gasses through the turbine, and decrease the speed of the compressor. However, routing gasses through the bypass path may result in thermodynamic energy being lost, e.g., engine-operating efficiency being decreased, when the gasses are not used to drive the turbine.

BRIEF DESCRIPTION

In one embodiment, an engine system comprises a turbocharger and a turbo-compound unit. The turbocharger includes a turbine mechanically coupled to a compressor. The turbo-compound unit is coupled in a bypass path around the turbocharger turbine. The turbo-compound unit includes a turbine mechanically coupled to a load, such as a generator.

Another embodiment relates to a method for an engine, e.g., for controlling the engine. The method comprises selectively routing an amount of gas through a bypass path that extends around a turbocharger turbine of a turbocharger of the engine. A turbo-compound unit is coupled in the bypass path. The turbo-compound unit includes a turbine driven by the amount of gas to generate power. The method further comprises adjusting the amount of gas routed through the bypass path in response to an engine operating condition.

Thus, the thermodynamic energy flowing through the bypass path may be harvested to increase the engine-operating efficiency and may be adjusted as a function of engine operating conditions to improve the transient response of the turbocharger. For example, energy may be harvested by a turbo-compound unit in the bypass path around the turbocharger turbine. Further, the flow through the bypass path may be adjusted to improve the transient response time of the turbocharger.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The invention will be understood from reading the following description of non-limiting embodiments, with reference to the attached drawings, wherein below.

DETAILED DESCRIPTION

Embodiments of the subject matter disclosed herein relate to a system and a method for a turbocharged engine. The engine may be included in a vehicle, such as a locomotive system. Other suitable types of vehicles may include on-highway vehicles and off-highway vehicles other than locomotives and other rail vehicles, such as mining equipment, marine vessels, or the like. Other embodiments of the invention may be used for stationary engines. The engine may be a diesel engine, or may combust another fuel or combination of fuels. Such alternative fuels may include gasoline, kerosene, biodiesel, natural gas, and ethanol—as well as combinations of the foregoing. Suitable engines may use compression ignition and/or spark ignition.

Figure 1:
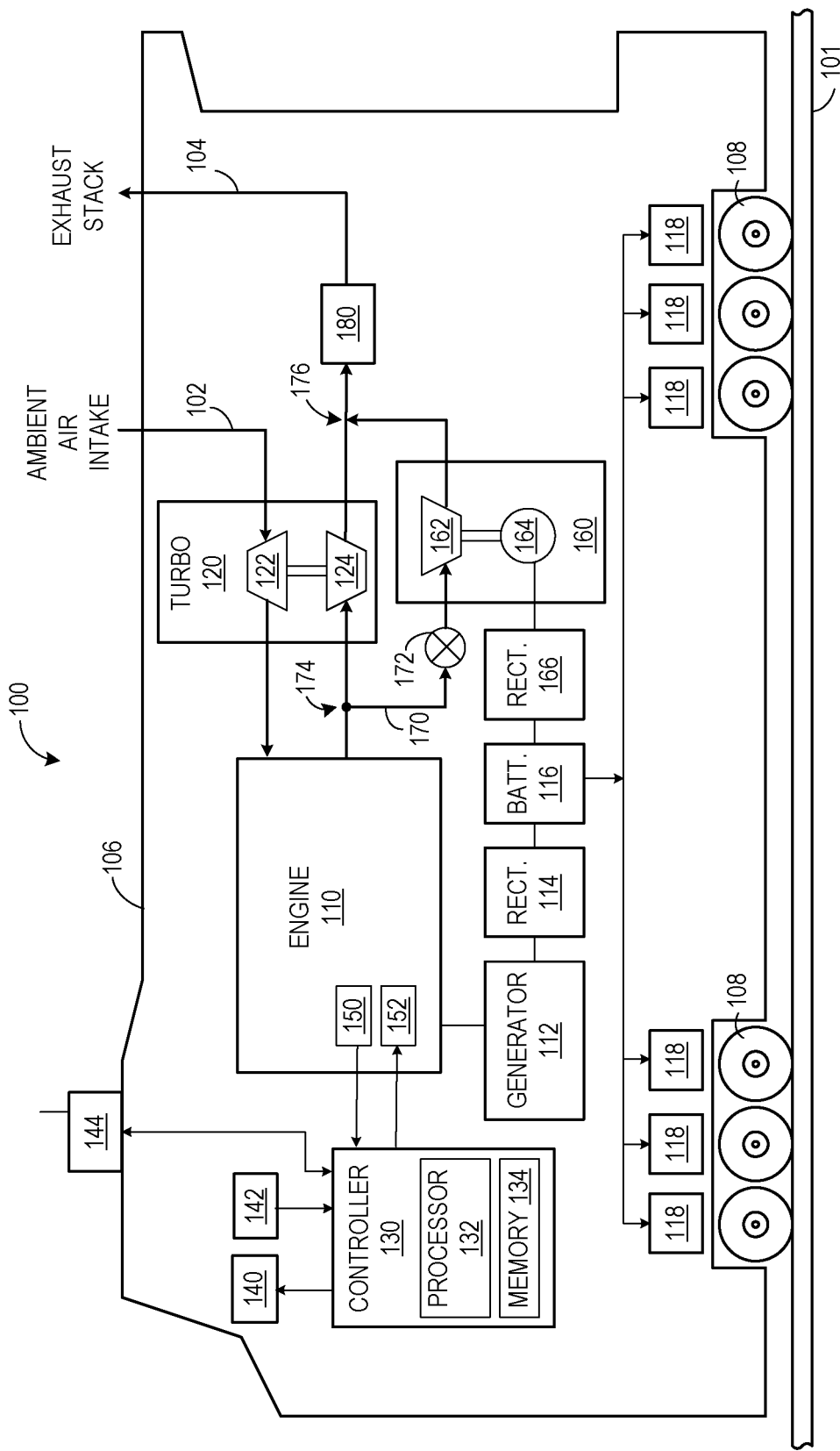
FIG. 1 shows an exemplary embodiment of a diesel-electric locomotive including an engine system comprising a turbocharger, a bypass path around the turbocharger turbine, and a turbo-compound unit coupled in the bypass path.

FIG. 1 shows a block diagram of an exemplary embodiment of a vehicle system 100 (e.g., a locomotive system), herein depicted as a rail vehicle 106, configured to run on a rail 101 via a plurality of wheels 108. As depicted, the rail vehicle 106 includes an engine system with an engine 110. In one embodiment, the rail vehicle 106 may be a diesel-electric rail vehicle. For example, the engine system may include a diesel engine that generates a torque output that is transmitted to a load, such as a generator 112. The generator 112 may produce electrical power to be stored and/or applied for subsequent propagation to a variety of downstream electrical components. In one embodiment, the generator 112 is configured to generate alternating current (AC) electric power that is rectified, e.g., converted to direct current (DC) power, by a rectifier (RECT.) 114 and stored in one or more batteries (BATT.) 116.

In one embodiment, DC power is supplied to downstream electrical components. For example, DC power may be supplied to a plurality of traction motors 118. Each traction motor of the plurality of traction motors 118 may be connected to one of a plurality of wheels 108 to provide tractive power to propel the rail vehicle 106. One example rail vehicle configuration includes one traction motor per wheel/axle pair. In one embodiment, each traction motor is a DC motor. In an alternate embodiment, each traction motor is an AC motor and one or more inverters are configured to convert the DC electrical power to AC electrical power. For example, a single inverter may convert DC electrical power to AC electrical power for a plurality of components. As another example, each of a plurality of distinct inverters may convert DC electrical power to AC electrical power for a distinct component.

The engine 110 receives intake air for combustion from an intake passage 102. The intake passage 102 receives ambient air from outside of the rail vehicle 106. Exhaust gas resulting from combustion in the engine 110 is supplied to an exhaust passage 104. Exhaust gas flows through the exhaust passage 104, and out of an exhaust stack of the rail vehicle 106. In one embodiment, exhaust gas may be recirculated from the exhaust passage 104 to the intake passage 102 through an exhaust gas recirculation (EGR) system (not shown).

The engine system includes a turbocharger 120 (TURBO) that is arranged between the intake passage 102 and the exhaust passage 104. The turbocharger 120 increases air charge of ambient air drawn into the intake passage 102 in order to provide greater charge density during combustion, to increase power output and/or engine-operating efficiency. In one embodiment, the turbocharger 120 includes a compressor 122 which is at least partially driven by a turbine 124. For example, the rotational speed of the compressor 122 may be controlled at least partially by the rate of gasses flowing through the turbine 124. As further elaborated herein and in FIGS. 2-4, the turbocharger 120 may include multiple turbine and/or compressor stages.

The compressor 122 may operate in an operating range between two conditions, namely, choke and surge. Choke occurs when the air flow mass flowing from the intake passage 102 through the compressor 122 cannot be increased for a given speed of the compressor 122. During choke, the turbocharger 120 cannot provide additional air to the engine 110, and so the engine power output density cannot be increased. Surge occurs during low air mass flow, when the air flow through the compressor 122 stalls and may reverse, potentially causing the engine to lose power. For example, surge may occur when the engine 110 suddenly decelerates and the turbocharger 120 continues to spin due to rotational inertia. Further, the operating range of the compressor 122 may include one or more ranges where the compressor 122 operates with higher efficiency compared to other ranges. The high efficiency ranges, such as high efficiency "islands" of minimum fuel usage, may be determined by at least one or more of the air mass flow through the compressor 122, the inlet pressure of the compressor 122, the outlet pressure of the compressor 122 (e.g., the boost pressure), and the rotational speed of the compressor 122. Thus, it may be desirable to control the rotational speed of the compressor 122 in order to keep the compressor 122 operating away from the surge and choke lines and in a high efficiency island.

One solution for controlling the rotational speed of the compressor 122 is to include a bypass path around the turbine 124 that is controlled by a wastegate valve. For example, the flow of gasses through the turbine 124 may be decreased by routing gasses away from the turbine 124 through the bypass path by increasing the opening of the wastegate valve. The reduction in the flow of gasses through the turbine 124 may reduce the speed of the compressor 122. Similarly, the flow of gasses through the turbine 124 may be increased by routing more gasses through the turbine 124 and less gasses through the bypass path, by decreasing the opening of the wastegate valve. The increase in the flow of gasses through the turbine 124 may increase the speed of the compressor 122.

However, use of a wastegate valve may result in thermodynamic energy being lost to the system when the energy through the bypass path is not harvested. Thus, in one embodiment, energy loss may be reduced if the turbocharger 120 is sized so that the wastegate valve can be closed during steady-state operation of the engine system. In an alternate embodiment, the turbocharger 120 may be "oversized" to meet airflow parameters at one or more peak engine operating points. For example, the turbocharger 120 may be sized large enough to provide ample boost pressure when the rail vehicle 106 is operating at high altitude, when the EGR system is off, etc. For this embodiment, the bypass path may be at least partially open at typical steady state sea level conditions so the boost can be maintained within engine operating parameters, such as cylinder pressure limits, etc.

Across different implementations, the size of the turbocharger 120 may increase as the engine size increases and the exhaust gas mass flow increases. A large engine, such as an engine for a diesel-electric locomotive, may include a large turbocharger so that the compressor can operate in a high efficiency island. However, increasing the size of the turbocharger may increase the rotational inertia of the turbocharger which may degrade the transient response of the turbocharger. For example, turbocharger response time, e.g., turbo lag, may be increased as the size of the turbocharger is increased.

In one embodiment, thermodynamic energy is harvested by a turbo-compound unit 160 coupled in a bypass path 170 of the turbocharger turbine 124. The bypass path may include an entry point 174 upstream of the turbocharger turbine 124 and an injection point 176 downstream of the turbocharger turbine 124. The turbo-compound unit 160 may include a turbo-compound unit turbine 162 that converts the thermodynamic energy of the gasses flowing through the bypass path 170 and the turbo-compound unit turbine 162 into rotational energy.

In one embodiment, the turbo-compound unit 160 is an electric turbo-compound unit including a generator 164 mechanically coupled to the turbine 162. In this manner, the rotational energy from the turbo-compound unit turbine 162 is converted to electrical energy by the generator 164. Thus, the turbo-compound unit 160 may generate electric power from the energy of the exhaust gasses flowing through the bypass path 170 and the turbo-compound unit turbine 162. Electricity produced by the generator 164 may be stored and/or applied for subsequent propagation to a variety of downstream electrical components. For example, the generator 164 may be an AC generator producing AC power that is converted to DC power by a rectifier (RECT.) 166 and stored in one or more batteries 116. As another example, the generator 164 may be a DC generator producing DC power.

In an alternate embodiment, the turbo-compound unit 160 is a mechanical turbo-compound unit including a gearbox mechanically coupled to the turbo-compound unit turbine 162. For example, the gearbox may be connected to a shaft of the engine so that power from the turbo-compound unit turbine 162 can be applied to the engine 110. Thus, the turbo-compound unit 160 may generate mechanical power from the energy of the exhaust gasses flowing through the bypass path 170 and the turbo-compound unit turbine 162.

Further, it may be desirable to increase the flow of gasses through the bypass path 170 when the thermodynamic energy of gasses flowing through bypass path 170 can be harvested. For example, a smaller turbocharger 120 may be utilized to increase the mass flow of exhaust gasses through bypass path 170 during steady-state operation of engine 110. The use of a smaller turbocharger 120 may infer additional benefits, as a smaller turbocharger 120 may include a smaller rotational inertia which may improve transient response of turbocharger 120. To further improve transient response of turbocharger 120, gas flow through bypass path 170 may be adjusted, such as with a wastegate valve 172, as further elaborated herein and in FIG. 6. The smaller turbine may also enable a wider operating range for the engine.

In some embodiments, the vehicle system 100 further includes an exhaust gas treatment system 180 coupled in the exhaust passage upstream or downstream of the turbocharger 120. In one example embodiment, the exhaust gas treatment system includes a diesel oxidation catalyst (DOC) and a diesel particulate filter (DPF). In other embodiments, the exhaust gas treatment system 180 additionally or alternatively includes one or more emission control devices. Such emission control devices may include a selective catalytic reduction (SCR) catalyst, three-way catalyst, $NO_x$ trap, or various other devices or systems.

The rail vehicle 106 further includes a controller 130 to control various components related to the vehicle system 100. In one example, the controller 130 includes a computer control system. In one embodiment, the computer control system includes a processor 132. The controller 130 may include multiple engine control units (ECU) and the control system may be distributed among each of the ECUs. The controller 130 further includes computer readable storage media, such as memory 134, including instructions for enabling on-board monitoring and control of rail vehicle operation. The memory 134 may include volatile and non-volatile memory storage.

The controller 130, while overseeing control and management of the vehicle system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 130 may receive signals from various engine sensors 150 including, but not limited to, engine speed, engine load, boost pressure, exhaust pressure, ambient pressure, mass air flow, exhaust temperature, etc. Correspondingly, the controller 130 may control the vehicle system 100 by sending commands to various components such as traction motors, alternator, cylinder valves, throttle, etc. Further, the controller 130 may include instructions for a closed loop feedback control system controlling the boost pressure by adjusting the flow of gasses through the bypass path 170. In one embodiment, the flow of gasses through the bypass path 170 may be controlled by adjusting a wastegate valve 172 or other flow control element. As another example, the controller 130 may adjust the flow of gasses through the bypass path 170 in response to an engine operating condition, such as a change in an engine power and/or torque output, engine acceleration, or engine deceleration.

The controller 130 may be further linked to a display 140, such as a diagnostic interface display, providing a user interface to the locomotive operating crew and a maintenance crew. The controller 130 may control the engine 110, in response to operator input via user input controls 142, by sending a command to correspondingly adjust various engine actuators 152. Non-limiting examples of user input controls 142 may include a throttle control (e.g., notch), a braking control, a keyboard, and a power switch.

The vehicle system 100 may further include a communications system 144 linked to the controller 130. In one embodiment, the communications system 144 includes a radio and an antenna for transmitting and receiving voice and data messages. For example, data communications may be between the vehicle system 100 and a control center of a railroad, another locomotive, a satellite, and/or a wayside device, such as a railroad switch. For example, the controller 130 may estimate geographic coordinates of the vehicle system 100 using signals from a GPS receiver. As another example, the controller 130 may transmit operational characteristics of the engine 110 to the control center via a message transmitted from the communications system 144.

Figure 2:
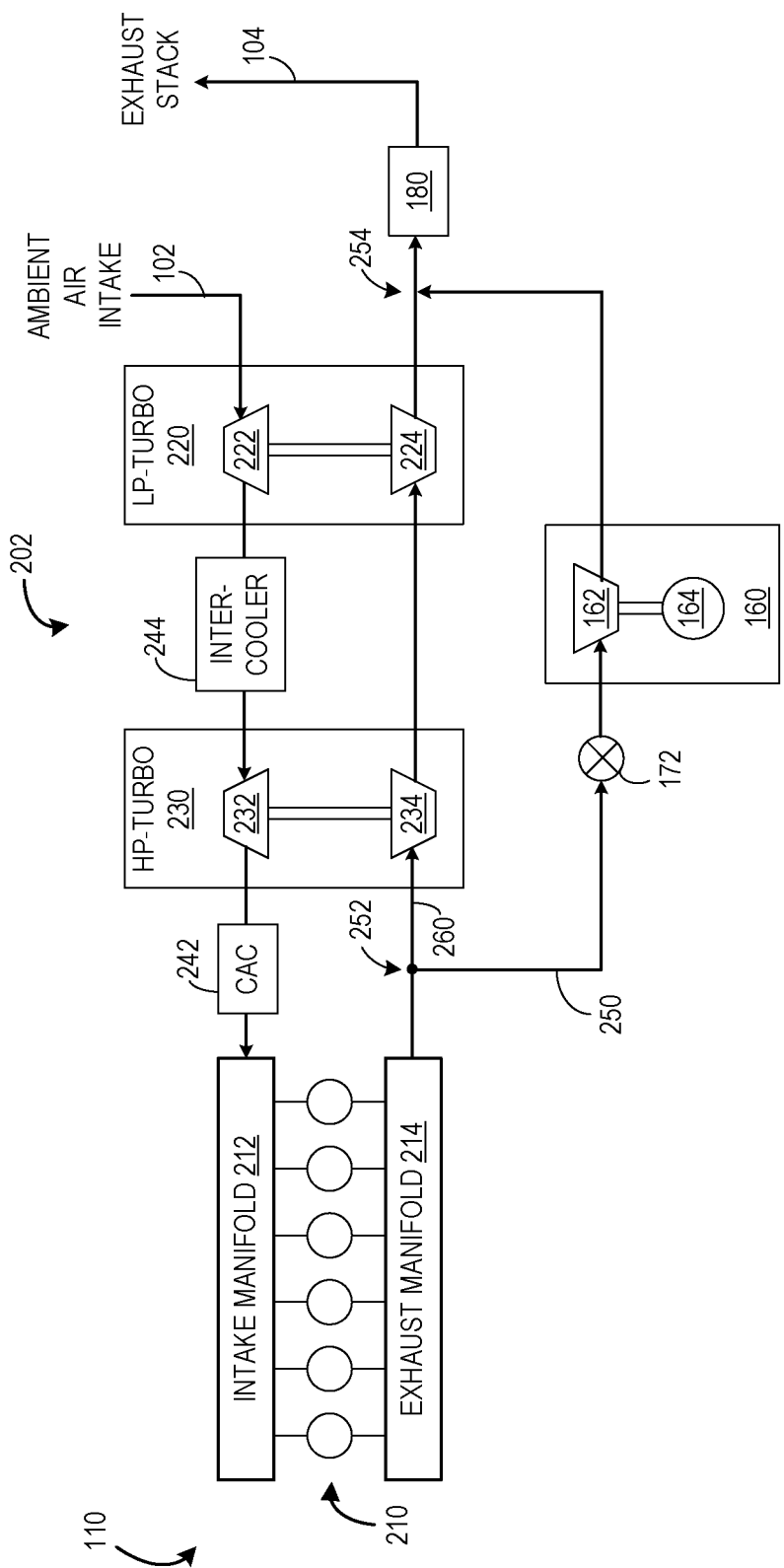
FIG. 2 shows an exemplary embodiment of an engine system including a multi-stage turbocharger, a bypass path, and a turbo-compound unit.
Figure 3:
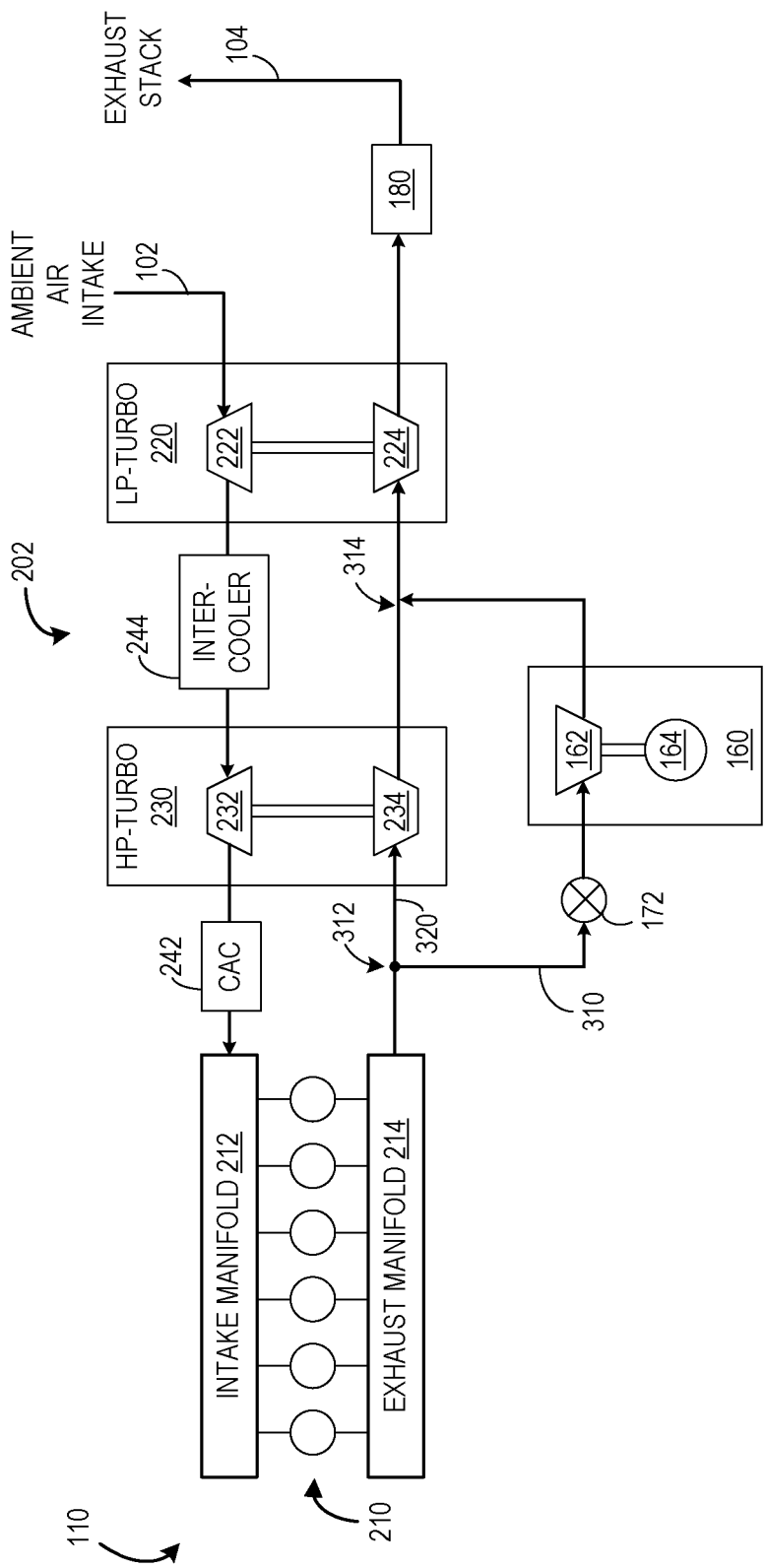
FIG. 3 shows an exemplary embodiment of an engine system including a multi-stage turbocharger, a bypass path, and a turbo-compound unit.
Figure 4:
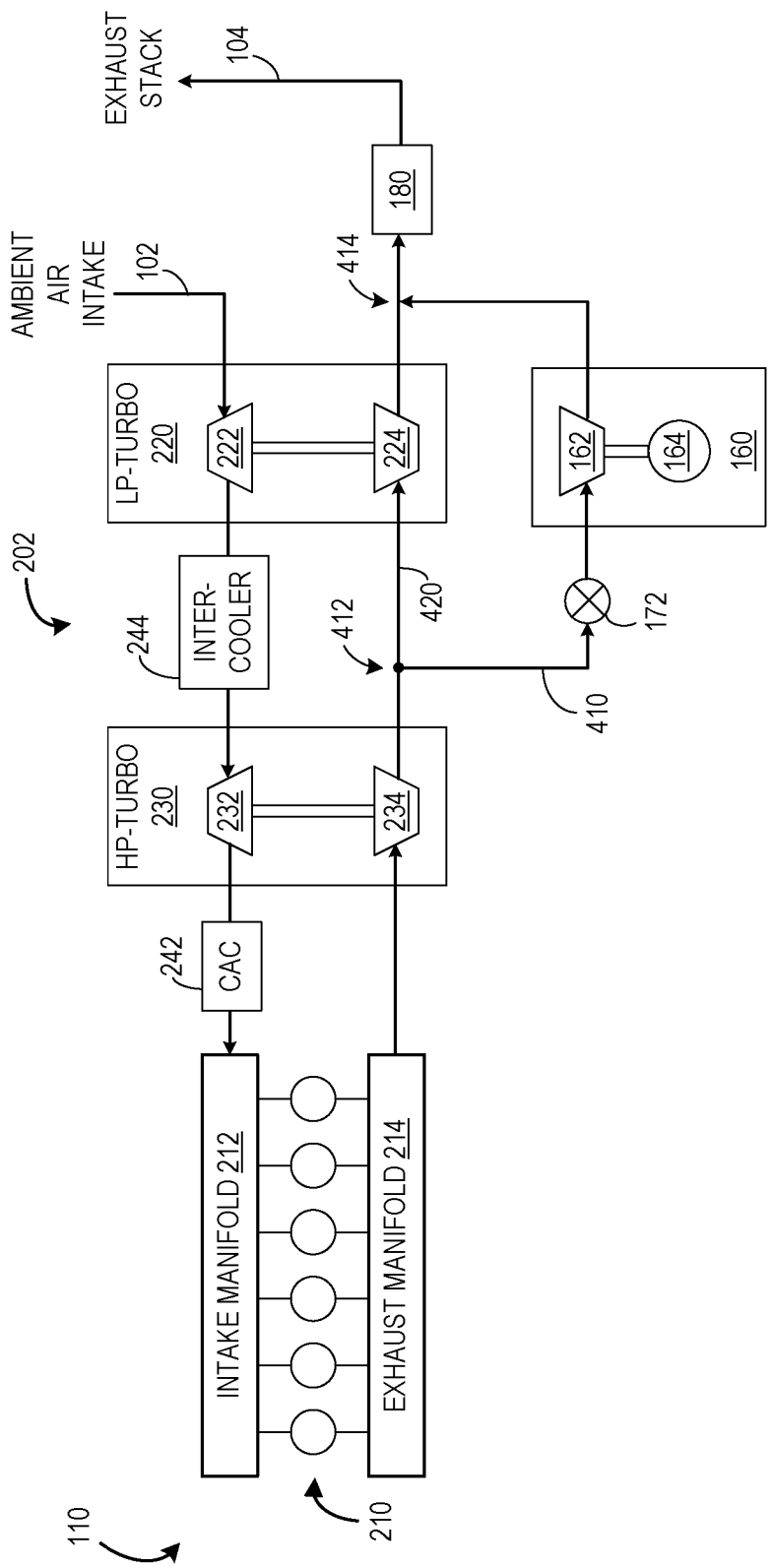
FIG. 4 shows an exemplary embodiment of an engine system including a multi-stage turbocharger, a bypass path, and a turbo-compound unit.

An engine system may include a multi-stage turbocharger, such as illustrated in the example embodiments of FIGS. 2-4. The engine system may include a bypass path around one or more turbine stages and a turbo-compound unit coupled in the bypass path around the one or more turbine stages.

FIG. 2 illustrates an embodiment of an engine system having a bypass path around the turbocharger turbines of all stages. The engine system includes a multi-stage turbocharger 202, a bypass path 250, and a turbo-compound unit 160. The depicted embodiment of FIG. 2 includes a two-stage turbocharger 202 (i.e., the multi-stage turbocharger, in this embodiment, is a two-stage turbocharger) having a low-pressure turbocharger stage (LP-TURBO) 220 in series with an intercooler 244 and a high-pressure turbocharger stage (HP-TURBO) 230. (In other non-limiting embodiments, the multi-stage turbocharger 202 includes more than two stages.) The low-pressure turbocharger stage 220 may include a low-pressure turbocharger compressor 222 and a low-pressure turbocharger turbine 224. The compressor 222 may be configured to compress gasses entering an inlet of the compressor 222 at near ambient pressure. For example, the compressor 222 may draw air at ambient pressure from the ambient air intake 102. In one embodiment, exhaust gasses are recirculated upstream of the compressor 222 and mixed with air. Thus, the compressor 222 may compress a combination of air and exhaust gasses. The compressor 222 may be at least partially driven by the low-pressure turbocharger turbine 224. Compression may heat the gasses, and so the intercooler 244 may be configured to cool the compressed gasses flowing from an outlet of the low-pressure turbocharger compressor 222. The high-pressure turbocharger stage 230 may include a high-pressure turbocharger compressor 232 and a high-pressure turbocharger turbine 234 mechanically coupled to the compressor 232. The compressor 232 may be configured to compress gasses flowing from the intercooler 244. In this manner, gasses may be compressed, or boosted, to successively higher pressures through each successive stage of the multi-stage turbocharger 202. In one embodiment, a charge air cooler (CAC) 242 is configured to cool the compressed gasses from an outlet of the high-pressure turbocharger compressor 232.

The compressed gasses may be mixed with fuel and combusted by the engine 110. For example, the engine 110 may include an intake manifold 212, a plurality of cylinders 210, and an exhaust manifold 214. The intake manifold 212 may be configured to route the compressed gasses to each cylinder of the plurality of cylinders 210, where the gasses may be combusted with fuel. The exhaust manifold 214 may be configured to route exhaust gasses from each cylinder of the plurality of cylinders 210 to an exhaust system. Further, the thermodynamic energy of the exhaust gasses may be used to drive one or more turbines in the exhaust system.

For example, a first portion of the exhaust gasses may be routed from the exhaust manifold 214 through the exhaust passage 260. The low-pressure turbocharger turbine 224 and the high-pressure turbocharger turbine 234 may be coupled in the exhaust passage 260 so that exhaust gasses flowing through the exhaust passage 260 drive the turbines 224 and

234. A second portion of exhaust gasses may be routed through the bypass path 250 around the multi-stage turbocharger 202, e.g., around turbines 224 and 234. In other words, the second portion of gasses may be routed from upstream of the high-pressure turbocharger turbine 234 to downstream of the low-pressure turbocharger turbine 224 without flowing through turbines 224 and 234. For example, the bypass path 250 may include an entry point 252 upstream of the turbine 234 and re-enter the main flow 254 downstream of the turbine 224. The turbo-compound unit 160 may be coupled in the bypass path 250 to generate power as gasses flow through the bypass path 250 and the turbo-compound unit turbine 162. In other words, gasses flowing through the bypass path 250 may drive the turbine 162 to generate power from the generator 164. In one embodiment, a wastegate valve 172 is coupled in the bypass path 250. In an alternate embodiment, the wastegate valve 172 is coupled in the exhaust passage 260, downstream of the entry point 252 and upstream of the re-entry point 254.

The wastegate valve 172 may be adjusted to vary the flow of gasses through the bypass path 250 and through the turbines 224 and 234 of the multi-stage turbocharger 202. For example, the wastegate valve 172 may be adjusted to increase the portion of gasses flowing through the exhaust passage 260 and decrease the portion of gasses flowing through the bypass path 250. Similarly, the wastegate valve 172 may be adjusted to decrease the portion of gasses flowing through the exhaust passage 260 and increase the portion of gasses flowing through the bypass path 250. The amount of power generated by a turbine in a turbo-compound unit or turbocharger may be related to the mass flow of gasses through the turbine. For example, the power of a turbine may be equal to the mass flow rate through the turbine multiplied by the difference of the specific enthalpies at the input and the output of the turbine. Thus, the power generated by the turbo-compound unit 160 may be related to the amount of gasses flowing through the turbo-compound unit turbine 162 and the bypass path 250. Further, the power generated by the turbo-compound unit 160 may be controlled by varying the amount of gasses flowing through the bypass path 250. Similarly, the power generated by the turbines 224 and 234 of the multi-stage turbocharger 202 and the rotational speed of the compressors 232 and 222 may be controlled by varying the amount of gasses flowing through the exhaust passage 260.

The amount gasses flowing from the exhaust manifold 214 may be divided between the first portion of gasses flowing through the exhaust passage 260 and the second portion of gasses flowing through the bypass path 250. Thus, increasing the amount of gasses in the first portion of gasses will decrease the amount of gasses in the second portion of gasses, since the first portion and the second portion of gasses sum to the amount of gasses flowing from the exhaust manifold 214. In one embodiment, the second portion of gasses flowing through the bypass path 250 may be stopped by closing the wastegate valve 172.

In an alternate embodiment, the bypass path has an alternate configuration, such as illustrated in FIG. 3. FIG. 3 illustrates an embodiment of an engine system having a bypass path around a first turbocharger turbine upstream of a second turbocharger turbine. The engine system includes a multi-stage turbocharger 202, a bypass path 310, and a turbo-compound unit 160. For example, the multi-stage turbocharger 202 may include one or more high-pressure turbochargers, such as high-pressure turbocharger 230, and one or more low-pressure turbochargers, such as low-pressure turbocharger 220. The bypass path 310 may be configured to bypass gasses around one or more high-pressure turbochargers. For example, the high-pressure turbocharger turbine 234 may be coupled to the exhaust passage 320, and the bypass path 310 may be configured to go around the exhaust passage 320. As another example, the bypass path 310 may include an entry point 312 upstream of the turbine 234 and a re-entry point 314 upstream of the low-pressure turbocharger turbine 224 and downstream of the high-pressure turbocharger turbine 234. The turbo-compound unit 160 may be coupled to the bypass path 310 for generating power from energy captured from gasses flowing through bypass path 310, e.g., the gasses turn the turbine, which in turn mechanically drives a shaft.

Exhaust gasses flowing from the exhaust manifold 214 may be divided between a first portion of gasses flowing through the exhaust passage 320 and the high-pressure turbocharger turbine 234, and a second portion of gasses flowing through the bypass path 310 and the turbo-compound unit turbine 162. The amount of gasses in the first and second portions may be varied by adjusting the wastegate valve 172, for example. In this manner, the amount of power generated by turbine 234 of high-pressure turbocharger 230 and turbine 162 of turbo-compound unit 160 may be varied by adjusting the wastegate valve 172.

The first portion and second portion of gasses may be combined upstream of the turbine 224 of the low-pressure turbocharger 220. For example, the first portion and second portion of gasses may be combined at point 314. Thus, varying the wastegate valve 172 may have less effect on the power generated by the turbine 224 of the low-pressure turbocharger 220 than if that turbine 224 were coupled to the bypass path 310.

The bypass path may have an alternate configuration, such as illustrated by FIG. 4. FIG. 4 illustrates an embodiment of an engine system having a bypass path around a first turbocharger turbine downstream of a second turbocharger turbine. The engine system includes a multi-stage turbocharger 202, a bypass path 410, and a turbo-compound unit 160. For example, the multi-stage turbocharger 202 may include one or more high-pressure turbochargers, such as high-pressure turbocharger 230, and one or more low-pressure turbochargers, such as low-pressure turbocharger 220. The bypass path 410 may be configured to bypass gasses around one or more low-pressure turbochargers. For example, the low-pressure turbocharger turbine 224 may be coupled to the exhaust passage 420, and the bypass path 410 may be configured to go around the exhaust passage 420. As another example, the bypass path 410 may include an entry point 412 downstream of the high-pressure turbocharger turbine 234 and upstream of the low-pressure turbocharger turbine 224 and a re-entry point 414 downstream of turbine 224. The turbo-compound unit 160 may be coupled to the bypass path 410 for generating power from energy captured from gasses flowing through the bypass path 410.

Exhaust gasses flowing from the exhaust manifold 214 may flow through the turbine 234 of the high-pressure turbocharger 230 before being divided between a first portion of gasses flowing through the exhaust passage 420 and the low-pressure turbocharger turbine 224, and a second portion of gasses flowing through the bypass path 410 and the turbo-compound unit turbine 162. The amount of gasses in the first and second portions may be varied by adjusting the wastegate valve 172, for example. In this manner, the amount of power generated by the turbine 224 of the low-pressure turbocharger 220 and the turbine 162 of the turbo-compound unit 160 may be varied by adjusting the wastegate valve 172. Because the wastegate valve 172 is downstream of the turbine 234 of the high-pressure turbocharger 230, varying the wastegate valve 172 may have less effect on the power generated by the turbine 234 than if the turbine 234 were coupled to the bypass path 410.

The engine systems illustrated in FIGS. 1-4 may be operated so thermodynamic energy flowing through the bypass path can be harvested to increase the engine-operating efficiency. Additionally or alternatively, the turbocharger may be increased in size to provide additional boost for peak engine operating conditions.

Figure 5:
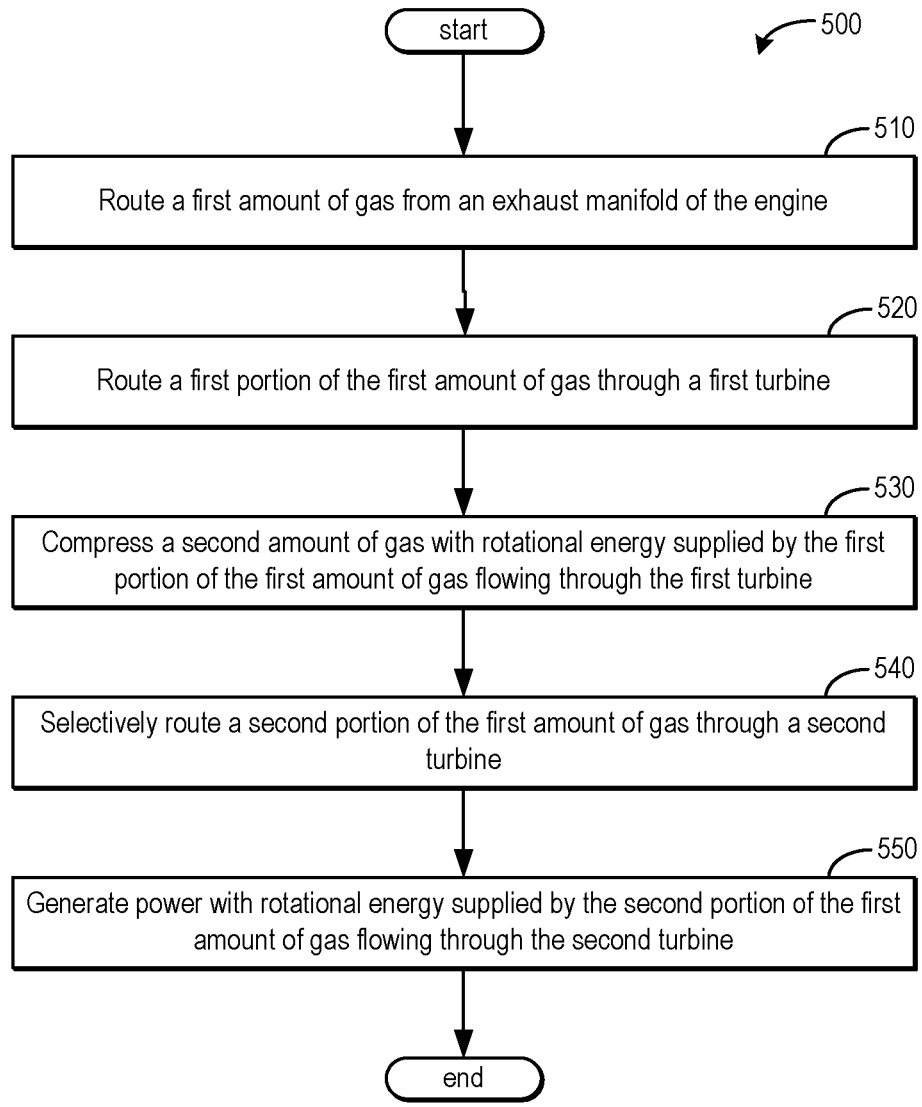
FIG. 5 shows an exemplary embodiment of a method for operating an engine.

For example, the method of FIG. 5 illustrates how the flow of gasses bypassed around a first turbine may be used to generate power with a second turbine. FIG. 5 illustrates an example embodiment of a method 500 for an engine, such as engine 110. At step 510, a first amount of gas may be routed from an exhaust manifold, such as exhaust manifold 214, of the engine. At step 520, a first portion of the first amount of gas may be routed through a first turbine. For example, the turbine may be turbine 124 of turbocharger 120. As another example, the turbine may be turbine 234 of high-pressure turbocharger 230. As another example, the turbine may be turbine 224 of low-pressure turbocharger 220. At step 530, a second amount of gas may be compressed with rotational energy supplied by the first portion of the first amount of gas through the first turbine. For example, gas may be compressed with compressor 122 driven by the rotational energy supplied by turbine 124. As another example, gas may be compressed with compressor 232 driven by the rotational energy supplied by turbine 234. As another example, gas may be compressed with compressor 222 driven by the rotational energy supplied by turbine 224.

At step 540, a second portion of the first amount of gas may be selectively routed from upstream of the first turbine through a second turbine to downstream of the first turbine. In one embodiment, the first portion of gas and the second portion of gas sum to the first amount of gas. For example, the second portion of gas may be routed through a bypass path around the first turbine. The second turbine, such as turbine 162 of turbo-compound unit 160, may be coupled to the bypass path so that the second portion of gas flows through the bypass path and turbine 162. In one embodiment, wastegate valve 172 may be coupled in the bypass path to control the amount of gas in the first portion and the amount of gas in the second portion. For example, the amount of gas in the first portion may be increased and the amount of gas in the second portion may be decreased by decreasing an opening of wastegate valve 172. As another example, all of the first amount of gas may be included in the first portion of gas by closing wastegate valve 172. Closing wastegate valve 172 may be desirable during an engine condition, such as during increased in desired engine output power.

At step 550, power may be generated with rotational energy supplied by the second portion of the first amount of gas through the second turbine. In one embodiment, electrical power may be generated. For example, turbo-compound unit 160 may include generator 164 mechanically coupled to turbine 162. In this manner, the thermodynamic energy of the second portion of gas may be captured as rotational energy of turbine 162 which may be used for producing electrical power from generator 164. In an alternate embodiment, mechanical power may be generated. For example, turbo-compound unit 160 may include a gearbox mechanically coupled to an engine shaft and to turbine 162. In this manner, the thermodynamic energy of the second portion of gas may be captured as rotational energy of turbine 162 which may be used for producing mechanical power to be used by the engine system.

Figure 6:
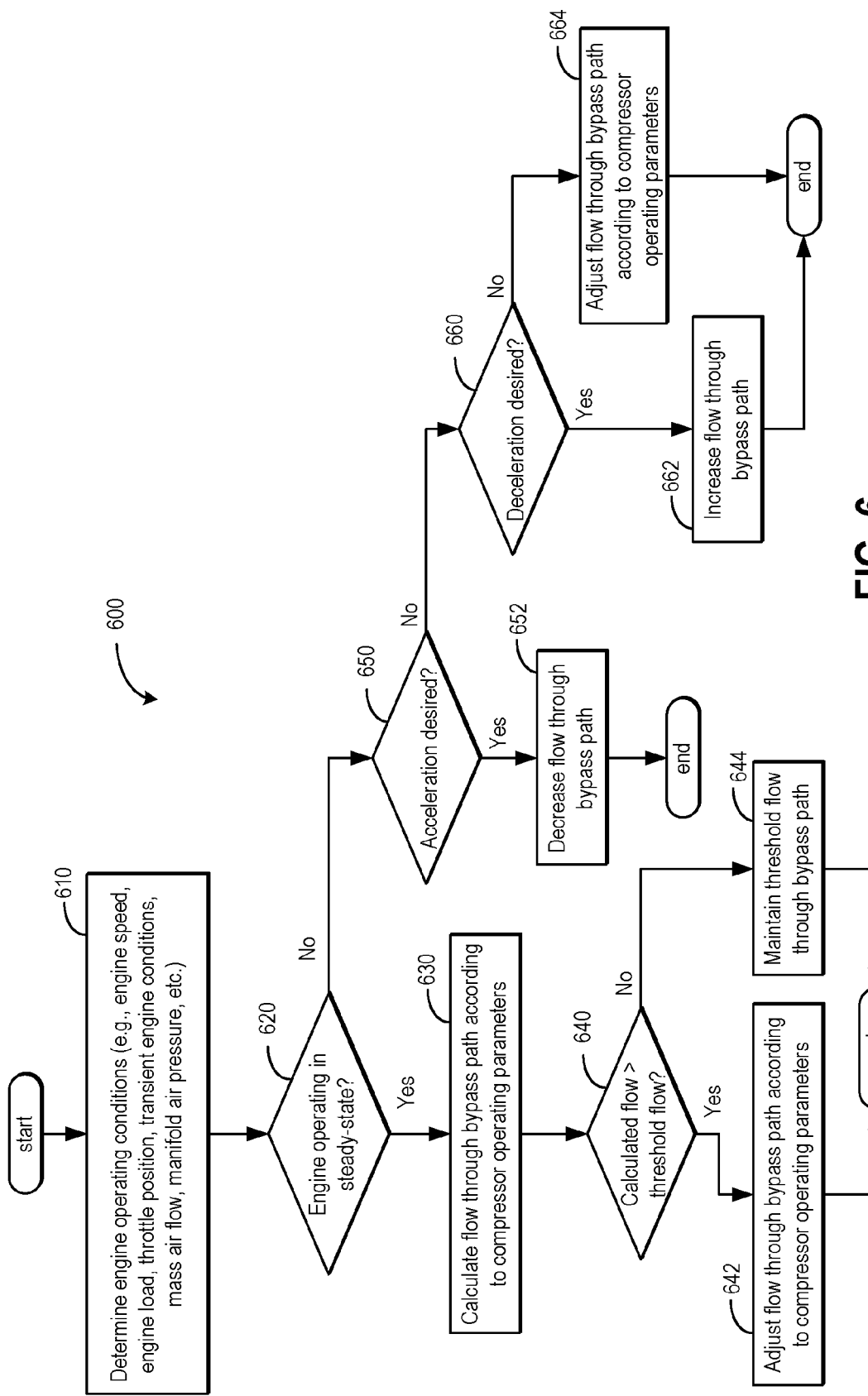
FIG. 6 shows an exemplary embodiment of a method for operating a turbocharged engine having a bypass path around the turbocharger turbine.

As further illustrated by the example embodiment of FIG. 6, the second portion of gas flowing through the bypass path may be adjusted in response to an engine operating condition to improve the transient response of a turbocharger of the engine system. For example, the flow of gas through the bypass path may be adjusted in response to a requested engine output power. FIG. 6 illustrates an example embodiment of a method 600 for operating a turbocharged engine having a bypass path around the turbine of a turbocharger of the engine. Method 600 may comprise selectively routing an amount of gas through the bypass path and generating power with a turbo-compound unit coupled in the bypass path. The turbo-compound unit may include a turbine driven by the amount of gas. The amount of gas through the bypass path may be adjusted in response to an engine operating condition. For example, method 600 may be used to improve a transient response of the turbocharger when the engine system is accelerating or decelerating.

Method 600 begins at step 610, where the operating conditions of the engine system may be determined. For example, at least one or more of engine speed, throttle control position, manifold air pressure, ambient air pressure, intake air mass flow, and compressor speed may be measured by engine sensors 150 and communicated to a controller, such as controller 130. Further, engine operating conditions may be estimated based on other operating parameters. For example, engine load and air/fuel ratio can be calculated based on other operating parameters.

As another example, transient engine conditions may be determined. For example, a transient increase in desired or actual engine output may be identified when a fuel injection amount is increased, when engine speed accelerates, and/or when engine load increased, for example. As another example, a rail vehicle 106 may include a throttle control with a finite number of throttle settings, or notches. For example, a locomotive may have an idle position and eight power positions, with notch eight indicating the highest power output and notch one indicating the lowest power output above idle. An increase in engine output may be identified when the throttle control is switched to a higher notch. Similarly, a decrease in engine output may be identified when the throttle control is switched to a lower notch or when engine speed or engine load is decreasing.

At step 620, it is determined if engine 110 is operating in steady-state. In one embodiment, a steady-state engine condition may be identified when the rate of change of engine speed or engine load is below a threshold. In one embodiment, a steady-state engine condition may be identified when there is no acceleration and no deceleration detected. Method 600 may continue at step 650 if engine 110 is not operating in steady-state, otherwise, method 600 may continue at step 630.

At step 630, engine 110 is operating in steady-state and the flow of gas through the turbocharger bypass path may be calculated according to compressor operating parameters. In one embodiment, the compressor operating parameters may be plotted on a compressor map. For example, the compressor map may include a plot of the pressure ratio of the compressor versus the mass gas flow through the compressor. The pressure ratio may be the pressure of gasses at the compressor outlet divided by the pressure of gasses at the compressor inlet. The compressor map may include a surge line showing the amount of mass gas flow to keep the compressor out of surge for a given pressure ratio. The compressor map may include a choke line showing where the amount of mass gas flow through the compressor cannot be increased for a given pressure ratio. The compressor map may include islands of constant efficiency, including high efficiency islands, showing how efficiency may change over different operating points of the compressor. The compressor map may include constant speed lines showing how compressor operating parameters change for a constant rotational speed of the compressor. Using the information from the compressor map, the compressor speed associated with choke and surge may be determined for a given pressure ratio, e.g., boost pressure. Similarly, a compressor speed associated with high efficiency of the compressor may be determined. The rotational speed of the compressor is controlled at least partially by the mass flow rate of gasses flowing through the turbine which may be determined by the mass flow rate of gasses through the bypass path. Thus, in one example, the flow of gas through the turbocharger bypass path may be calculated to operate compressor 122 out of surge and choke. In another example, the flow of gas through the turbocharger bypass path may be calculated to operate compressor 122 in a high-efficiency island and to supply the necessary airflow to the engine.

At step 640, it may be determined if the calculated flow of gas through the turbocharger bypass path is greater than a threshold flow. It may be desirable to maintain a flow of gas through the bypass path during a steady-state condition of the engine. In one example, the efficiency of turbine 162 and generator 164 may be increased when the mass flow of gas through turbine 162 remains above a threshold value. As another example, and as further elaborated at steps 650 and 652, the flow of gas through the bypass path may be rerouted during acceleration to improve the transient response of the engine. Further, by harvesting the thermodynamic energy of the exhaust gasses with the turbocharger and the turbo-compound unit, the turbocharger may be operated with at least some bypass flow that generates additional energy that may be used by the engine or vehicle. In this way, it is possible to provide energy recovery, operational flexibility, and improved transient response, which can potentially lead to a greater operating range for the engine. Also, including the turbo-compound unit in the bypass flow can result in greater efficiency than bypassing alone. In other words, the overall efficiency of the engine system may potentially be increased by routing gasses through the bypass path of the turbocharger during engine steady-state so the turbo-compound unit may generate power. If the calculated flow of gas through the turbocharger bypass path is greater than the threshold flow, then at step 642, the flow of gas through the turbocharger bypass path may be adjusted according to the flow calculated at step 630 and method 600 may end. Otherwise, at step 644, the flow of gas through the turbocharger bypass path may be maintained at the threshold value and then method 600 may end.

At step 650, it may be determined if an acceleration of the engine is desired. For example, during acceleration, it may be desirable to increase the boost pressure by increasing the speed of the compressor. However, the rotational inertia of the turbocharger may resist the increase in speed of the compressor. A typical large engine may have highest efficiency when the engine includes a relatively large turbocharger and the bypass path is closed in the steady-state since the energy flowing through the bypass path is not harvested. The transient response of the turbocharger may have a less than desirable transient response because the increase of gasses flowing through the turbine, the increase in boost pressure, and the increase in compressor speed are resisted by the rotational inertia of the turbocharger.

However, engine efficiency can be potentially maintained or increased by routing gasses through the bypass path during steady-state when a turbo-compound unit is coupled to the bypass path. For example, the thermodynamic energy through the bypass path may be harvested by the turbo-compound unit. Further, during an engine acceleration, the flow of gasses through the bypass path may be reduced or stopped so that the turbine may receive an increase in gasses as compared to steady-state operation. As a result, transient response of the turbocharger may be improved by decreasing the flow of gasses through the bypass path so the flow of gasses through the turbine may be increased.

In this manner, the turbocharger may be made smaller since it may have a reduced amount of exhaust gasses flowing through the turbine in steady-state. A smaller turbocharger may have less rotational inertia than a larger turbocharger. Thus, transient response of the turbocharger may be improved.

As an alternative to reducing the size of the turbocharger, coupling the turbo-compound unit to the bypass path may enable increased operational margin for the engine. For example, the turbocharger size may be increased, to provide increased boost pressure at peak engine operating conditions. During steady-state operation, the bypass path may be open and energy through the bypass path may be captured by the turbo-compound unit. During an acceleration, the bypass path may be closed and the turbocharger can provide increased boost more quickly as compared to a turbocharger sized for the wastegate to be closed in steady state operation.

Thus, at step 650, it is determined if an acceleration is desired. If an acceleration is desired, at step 652, the flow of gasses through the bypass path may be decreased. In this manner, the flow of gasses through the turbine may be increased and the transient or peak response of the turbocharger may be improved. If an acceleration is not desired, method 600 may continue at step 660.

At step 660, it is determined if a deceleration is desired. If a deceleration is desired, at step 662, the flow of gas through the bypass gas may be increased. Thus, the flow of gas through the turbine may be decreased so the compressor speed may be decreased. If a deceleration is not desired, then the flow of gas through the bypass path may be adjusted according to the compressor operating parameters.

In this manner, method 600 has the technical effect of operating a turbocharged engine, where the turbocharged engine includes a bypass path around the turbocharger turbine, and a turbo-compound unit is coupled in the bypass path.

Certain embodiments herein are characterized as having a low-pressure turbocharger and a high-pressure turbocharger (or related components). "Low" and "high" are relative to one another, meaning a low-pressure turbocharger operates at a lower pressure than a "high" pressure turbocharger, and a high-pressure turbocharger operates at a higher pressure than a low-pressure turbocharger.

In the appended claims, the terms "including" and "having" are used as the plain-language equivalents of the term "comprising"; the term "in which" is equivalent to "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. Moreover, unless specifically stated otherwise, any use of the terms first, second, etc., do not denote any order or importance, but rather the terms first, second, etc., are used to distinguish one element from another.

The invention claimed is:

1. A method for an engine, comprising:
    selectively routing an amount of gas through a bypass path around a turbocharger turbine of an engine turbocharger, wherein a turbo-compound unit is coupled in the bypass path, the turbo-compound unit including a turbo-compound unit turbine driven by the amount of gas to generate power, and wherein an additional turbocharger including an additional turbocharger turbine is positioned upstream of the turbocharger turbine, and wherein the additional turbocharger turbine is upstream of an entry point of the bypass path; and
    adjusting the amount of gas routed through the bypass path in response to an engine operating condition.

2. The method of claim 1, further comprising routing gas through the bypass path during a steady-state condition of one or more of an engine speed, an engine load, or a throttle control position.

3. The method of claim 1, further comprising decreasing the amount of gas routed through the bypass path in response to an increase in engine output.

4. The method of claim 1, further comprising increasing the amount of gas routed through the bypass path in response to a decrease in engine output.

5. The method of claim 1, wherein the power generated by the turbo-compound unit is electrical power.

6. An engine system, comprising:
    a turbocharger including a turbocharger turbine mechanically coupled to a compressor;
    a turbo-compound unit including a turbo-compound unit turbine mechanically coupled to a load, the turbo-compound unit coupled in a bypass path around the turbocharger turbine; and
    an additional turbocharger including an additional turbocharger turbine, the additional turbocharger turbine positioned downstream of the turbocharger turbine,
    wherein the additional turbocharger turbine is upstream of a re-entry point of the bypass path.

7. The engine system of claim 6, further comprising a valve coupled in the bypass path of the turbocharger turbine, the valve and the turbo-compound unit turbine connected in series.

8. The engine system of claim 7, wherein the valve is upstream of the turbo-compound unit turbine and downstream of an entry point of the bypass path.

9. The engine system of claim 6, wherein the load includes a generator.

10. An engine system, comprising:
    a turbocharger including a turbocharger turbine mechanically coupled to a compressor;
    a turbo-compound unit including a turbo-compound unit turbine mechanically coupled to a load, the turbo-compound unit coupled in a bypass path around the turbocharger turbine; and
    an additional turbocharger including an additional turbocharger turbine, the additional turbocharger turbine positioned upstream of the turbocharger turbine,
    wherein the additional turbocharger turbine is upstream of an entry point of the bypass path.

11. A vehicle system, comprising:
    an engine including a turbocharger;
    a bypass path configured to route exhaust gasses around a turbocharger turbine of the turbocharger;
    a turbo-compound unit coupled in the bypass path, the turbo-compound unit including a turbo-compound unit turbine and an electrical generator configured to be powered by rotational energy supplied by the turbo-compound unit turbine;
    a flow control element coupled in the bypass path;
    a control system having a non-transitory computer readable storage medium including instructions for adjusting the flow control element to control the exhaust gasses routed through the bypass path; and
    an additional turbocharger including an additional turbocharger turbine downstream of the turbocharger turbine, the additional turbocharger turbine positioned upstream of an injection point of the bypass path.

12. The vehicle system of claim 11, wherein the flow control element is a valve, and the instructions for adjusting the valve include instructions for adjusting the flow of gasses through the turbocharger turbine to control the speed of a compressor of the turbocharger.

13. The vehicle system of claim 11, wherein the flow control element is a valve, and the instructions for adjusting the valve include instructions for closing the valve when a speed of the engine is accelerating.

* * * * *